(12) United States Patent
Colombo

(10) Patent No.: US 10,949,570 B2
(45) Date of Patent: Mar. 16, 2021

(54) PROCESSING SYSTEM, RELATED INTEGRATED CIRCUIT AND METHOD

(71) Applicant: STMicroelectronics Application GmbH, Ascheim-Dornach (DE)

(72) Inventor: Roberto Colombo, Munich (DE)

(73) Assignee: STMICROELECTRONICS APPLICATION GMBH, Ascheim-Dornach (DE)

( * ) Notice: Subject to any disclaimer, the term of this patent is extended or adjusted under 35 U.S.C. 154(b) by 277 days.

(21) Appl. No.: 16/039,103

(22) Filed: Jul. 18, 2018

(65) Prior Publication Data

US 2019/0026498 A1    Jan. 24, 2019

(30) Foreign Application Priority Data

Jul. 19, 2017    (IT) .................. 102017000082176

(51) Int. Cl.
 *G06F 21/71*    (2013.01)
 *G06F 21/44*    (2013.01)
 *G06F 21/62*    (2013.01)
 *G06F 21/79*    (2013.01)
(52) U.S. Cl.
 CPC .............. *G06F 21/71* (2013.01); *G06F 21/44* (2013.01); *G06F 21/62* (2013.01); *G06F 21/79* (2013.01); *H04L 2209/84* (2013.01)
(58) Field of Classification Search
 None
 See application file for complete search history.

(56) References Cited

U.S. PATENT DOCUMENTS

| | | | |
|---|---|---|---|
| 5,781,793 A | 7/1998 | Larvoire et al. | |
| 6,036,856 A * | 3/2000 | Ono .................... | G01N 30/8651 210/198.2 |
| 6,145,085 A * | 11/2000 | Tran ........................ | G06F 21/31 726/5 |
| 6,510,522 B1 * | 1/2003 | Heinrich ................. | G06F 21/70 710/100 |
| 2003/0233534 A1 * | 12/2003 | Bernhard .............. | G06F 9/4411 713/1 |
| 2009/0158444 A1 | 6/2009 | Goss et al. | |
| 2013/0019305 A1 * | 1/2013 | Berenbaum ......... | G06F 12/1408 726/19 |
| 2014/0223090 A1 * | 8/2014 | Malone .................. | G11C 19/00 711/104 |
| 2015/0331043 A1 * | 11/2015 | Sastry ................ | G01R 31/3177 714/727 |
| 2016/0188876 A1 * | 6/2016 | Harris ................... | G06F 21/554 726/23 |

(Continued)

*Primary Examiner* — Henry Tsang
(74) *Attorney, Agent, or Firm* — Slater Matsil, LLP

(57) ABSTRACT

In an embodiment, a processing system includes a non-volatile memory, a hardware block, a protection circuit associated with the hardware block, and a password verification circuit. The non-volatile memory stores at least one reference password. The password verification circuit is configured to receive a password verification command, obtain a reference password, and test whether the passwords correspond. In case the passwords correspond, the password verification circuit generate an overwrite signal. The protection circuit is configured to receive a control command and selectively forward the control command to the associated hardware block as a function of the overwrite signal.

21 Claims, 6 Drawing Sheets

(56) References Cited

U.S. PATENT DOCUMENTS

2016/0285892 A1* 9/2016 Kishinevsky ........... G06F 21/57
2018/0357012 A1  12/2018 Colombo
2018/0357015 A1  12/2018 Colombo

* cited by examiner

PROCESSING SYSTEM, RELATED INTEGRATED CIRCUIT AND METHOD

CROSS-REFERENCE TO RELATED APPLICATIONS

This application claims priority to Italian Patent Application No. 102017000082176, filed on Jul. 19, 2017, which application is hereby incorporated herein by reference.

TECHNICAL FIELD

The present disclosure relates generally to electronic circuits, and, in particular embodiments, to processing systems, related integrated circuits, and method.

BACKGROUND

FIG. 1 shows a typical electronic system, such as the electronic system of a vehicle, comprising a plurality of processing systems lox, such as embedded systems or integrated circuits, e.g., a Field Programmable Gate Array (FPGA), Digital Signal Processor (DSP) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

Future generations of processing systems, in particular micro-controllers dedicated to automotive applications, will exhibit a significant increase in complexity, mainly due to the increasing number of functionalities (such as new protocols, new features, etc.) and to the tight constraints concerning the operation conditions of the system (such as lower power consumption, increased calculation power and speed, etc.).

In parallel, the security framework of each processing system 10 becomes also more and more complex, which determines an increase of the time and complexity of the testing phase, needed to guarantee the functionality and robustness of the security framework.

Generally, the security framework is based on the concept of resource protection, i.e., given a set of resources, the framework is designed so that the access to one or more resources may be selectively blocked or granted under based on specific conditions. For example, one of these conditions may be based on a password, i.e., access to the resource is blocked until the correct password is provided.

SUMMARY

Some embodiments handle the password management within a processing system, such as a micro-controller.

Some embodiments may be implemented in an MCU of an ECU of a vehicle.

According to one or more embodiments, a processing system has the features specifically set forth in the claims that follow. Embodiments moreover concern a related integrated circuit and method.

As mentioned before, various embodiments of the present disclosure relate to a processing system. As usual, such processing system may comprise one or more processing units, such as microprocessors, volatile and non-volatile memories, and further resources.

Specifically, in various embodiments, the processing system comprises a non-volatile memory adapted to store at least one reference password, such as the program memory of the microprocessor.

In various embodiments, the processing system comprises moreover a hardware block, such as a processing unit, a memory or a resource, and a protection circuit associated with the hardware block. Specifically, the protection circuit is configured to receive a control command for the associated hardware block and selectively forward the control command to the associated hardware block, thereby controlling access to the associated hardware block, e.g., by using a debug interface or another block of the processing system. For example, in various embodiments, the access control may be configured by using life cycle data and/or configuration data.

In various embodiments, the protection circuit may also control the access as a function of an overwrite signal provided by a password verification circuit, i.e., the protection circuit may selectively forward the control command to the associated hardware block as a function of the overwrite signal provided by the password verification circuit, e.g., in order to permit access when the overwrite signal indicates that a password verification operation was successful.

Specifically, in various embodiments, the password verification circuit is configured to receive a password verification command including a password. Similar to the control command, also the password verification command may be provided by another block of the processing system, such as a processing unit and/or a communication interface.

In various embodiments, the password verification circuit obtains then one of the at least one reference password stored in the non-volatile memory and tests whether the password received and the reference password correspond. Finally, when the passwords correspond, the password verification circuit may generate the overwrite signal.

Specifically, in various embodiments, the reference password is not obtained dynamically from the non-volatile memory for each password verification operation, but the processing system comprises a temporary password repository including a memory adapted to store the at least one reference password, and a password upload circuit configured to read the at least one reference password once from the non-volatile memory, e.g., during the start-up of the processing system, and store the at least one reference password read from the non-volatile memory in the temporary password repository. Accordingly, in various embodiments, the password verification circuit may obtain the reference password from the temporary password repository.

Generally, the temporary password repository may also comprise a plurality of slots for storing a plurality of reference passwords. In this case, the password verification command may include a field for specifying a slot number and the temporary password repository may provide the reference password stored in the slot indicated by the slot number. Similarly, the password verification circuit may generate for each slot a respective overwrite signal indicating that the password received and the reference password stored in the slot indicated by the slot number correspond.

In various embodiments, the reference password(s) are read from the non-volatile memory and stored in the temporary password repository when the processing system is switched on and the other blocks, in particular the processing unit and/or the communication interface, are not operative yet.

For example, in various embodiments, the processing system comprises at least one hardware block and/or protection circuit configured to change operation as a function of configuration data. For example, as mentioned before, the access control implemented in the protection circuit may be configured by means of these configuration data. Specifically, in various embodiments, these configuration data may also be stored in the non-volatile memory. For example, in various embodiments, the processing system may comprise at least one first configuration data client associated with this at least one hardware block and/or protection circuit, where the at least one first configuration data client is configured to receive configuration data and provide the configuration data received to the associated at least one hardware block and/or protection circuit. The processing system comprises also a hardware configuration module configured to read the configuration data from the non-volatile memory and transmit the configuration data to the at least one first configuration data client.

In various embodiments, the reference password(s) are stored together with this configuration data in the non-volatile memory, i.e., the reference password(s) are part of the configuration data. In this case, the processing system may comprise at least one second configuration data client associated with the temporary password repository, i.e., the at least one second configuration data client is configured to receive configuration data from the hardware configuration module and provide the configuration data to the temporary password repository, whereby when the hardware configuration module reads the configuration data from the non-volatile memory, the hardware configuration module transmits the at least one reference password to the at least one second configuration data client associated with the temporary password repository.

As mentioned before, in various embodiments, the reference password(s) are loaded into the temporary password repository during the start-up of the processing system. For this purpose, the processing system may comprise a reset circuit configured to generate a reset signal when the processing system is switched on. The hardware configuration module may thus read the configuration data from the non-volatile memory and transmit the configuration data to the at least one first and second configuration data client in response to the reset signal.

As mentioned before, the control command and/or the password verification command may be provided by another block of the processing system, such as a processing unit and/or a communication interface.

For example, in various embodiment, the processing system comprises a communication bus, such as a Joint Test Action Group (JTAG) bus, where the hardware block to be controlled is connected to the communication bus via the associated protection circuit in order to receive the control command. Similarly, the password verification circuit may comprise a first interface connected to this communication bus for receiving the password verification command.

In addition or alternatively, the password verification circuit may comprise a second interface for receiving the password verification command (e.g., directly) from the processing unit. This is particularly useful when the processing unit is a microprocessor, because in this case the second interface may comprise at least one register addressable by the microprocessor via software instructions.

In various embodiment, in order to improve security, when the password and the one reference password correspond, the password verification circuit may transmit (in addition to the overwrite signal) a signal containing an identification of the device, e.g., the processing unit and/or the device connected to the communication interface, having provided the password verification command. For example, the password verification circuit may extract this identification from the password verification command.

Accordingly, in various embodiments, once at least one reference password has been stored in the non-volatile memory and the processing system has been started, the password upload circuit will automatically read the reference password(s) from the non-volatile memory and store the reference password(s) in the temporary password repository. Next, the password verification circuit may receive a password verification command including a password from the processing unit and/or the communication interface. In response to this password verification command, the password verification circuit obtains one of the reference password(s) from the temporary password repository and tests whether the password received and the one reference password correspond. Finally, when the passwords correspond, the password verification circuit may transmit an overwrite signal to a protection circuit of the processing system.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
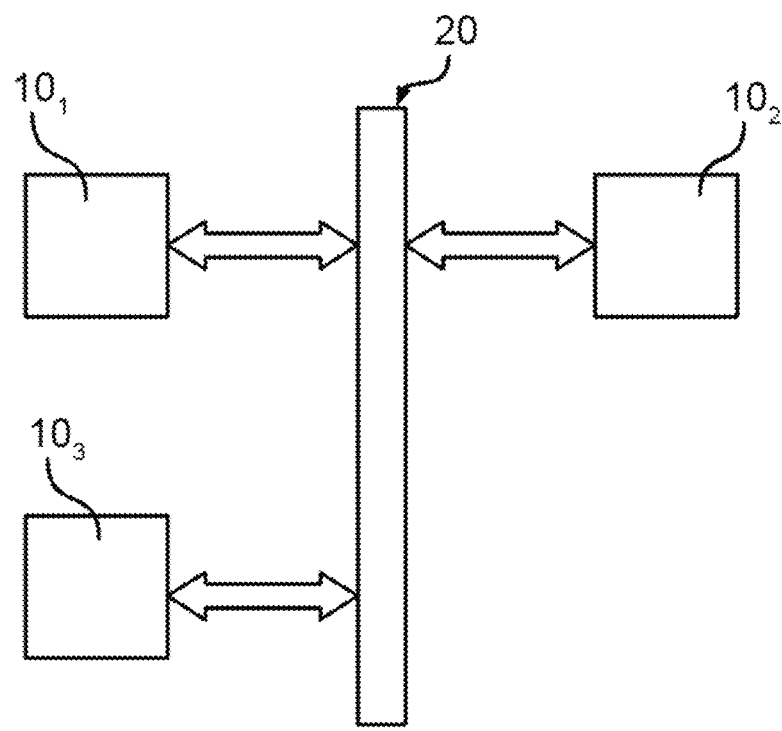
FIG. 1 shows a typical electronic system.

In the following FIGS. 2 to 12, parts, elements or components which have already been described with reference to FIG. 1 are denoted by the same references previously used in such Figure; the description of such previously described elements will not be repeated in the following in order not to overburden the present detailed description.

Figure 2:
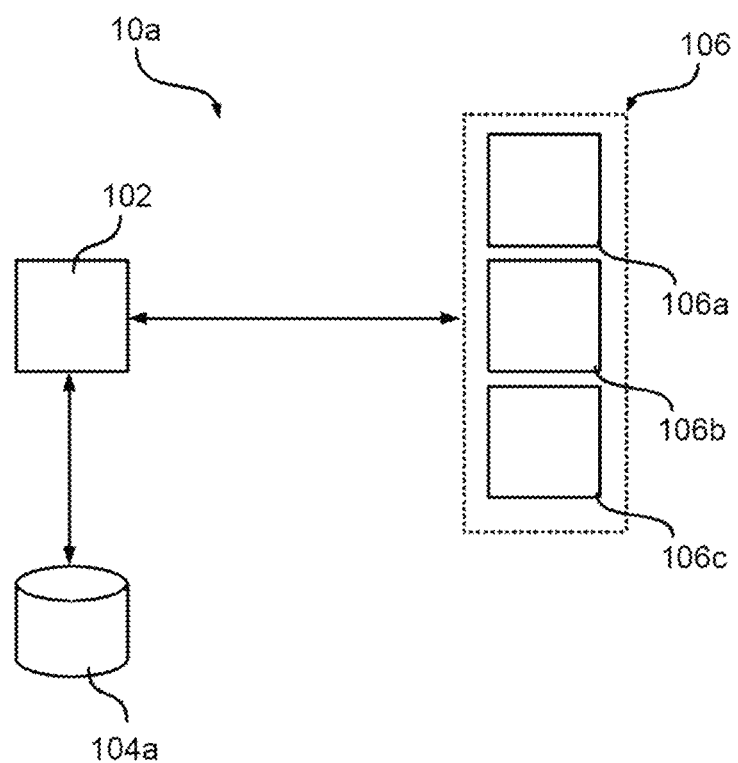
FIG. 2 shows an embodiment of a processing system.

FIG. 2 shows a block diagram of an embodiment of a digital processing system 10a, such as a micro-controller.

In the embodiment considered, the processing system 10a comprises at least one processing unit 102, such as a microprocessor, usually the Central Processing Unit (CPU), programmed via software instructions. Usually, the software executed by the processing unit 102 is stored in a program memory 104a, such as a non-volatile memory, such as a Flash memory or EEPROM. Generally, the memory 104a may be integrated with the processing unit 102 in a single integrated circuit, or the memory 104a may be in the form of a separate integrated circuit and connected to the processing unit 102, e.g., via the traces of a printed circuit board. Thus, in general the memory 104a contains the firmware for the processing unit 102, where the term firmware includes both the software of a microprocessor and the programming data of a programmable logic circuit, such as a FPGA.

In the embodiment considered, the processing unit 102 may have associated one or more resources 106, such as: one or more memories 106a, such as a Random Access Memory (RAM), one or more communication interfaces 106b, such as an Universal asynchronous receiver/transmitter (UART), Serial Peripheral Interface Bus (SPI), Inter-Integrated Circuit (I2C), CAN bus, Ethernet, and/or debug interface; and/or one or more further resources 106c, such as: analog-to-digital and/or digital-to-analog converters; and/or one or more dedicated digital components, such as hardware timers and/or counters, or a cryptographic co-processor; and/or one or more analog components, such as comparators, sensors, such as a temperature sensor, etc.; and/or one or more mixed signal components, such as a Pulse-Width Modulation (PWM) driver.

Accordingly, the digital processing system 10a may support different functionalities. For example, the processing systems may have different hardware architectures. For example, the processing units 102 may have different architectures and processing speeds, and/or the number and type of the hardware resources 106 may vary. Moreover, the behavior of the processing unit 102 is determined by the firmware stored in the memory 104a, e.g., the software instructions to be executed by a microprocessor 102 of a microcontroller 10a. Thus, by installing a different firmware, the same hardware (micro-controller) can be used for different applications.

Figure 3:
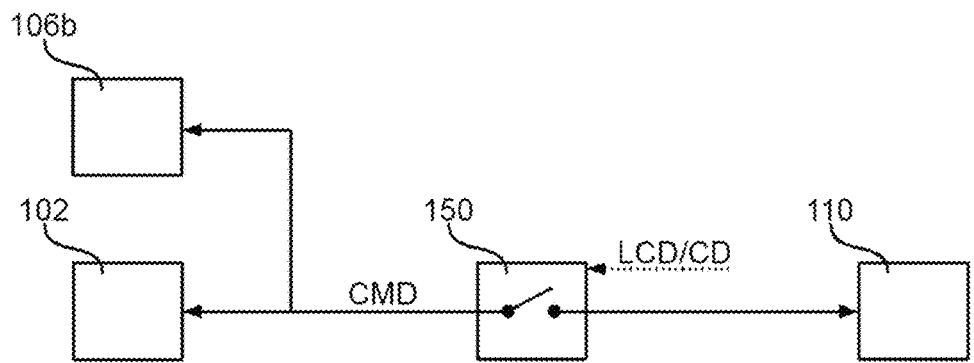
FIG. 3 shows a first embodiment of the security architecture of a processing system.

FIG. 3 shows an embodiment of the security architecture of the processing system 10a.

As mentioned before, the security architecture of a processing system 10a, such as a microcontroller, is aimed to limit access to one or more of the resources 110 of the processing system, such as the program memory 104a, the processing unit 102 and/or one or more resources 106.

For example, as shown in FIG. 3, one or more of the resources 110 of the processing system may have associated a protection circuit 150 configured to control access to the respective resource 110. For example, respective access requests CMD may be received from another resource 110 of the processing system 10a, such as the processing unit 102 and/or a communication interface 106b, such as a debug interface.

For example, in various embodiments, the protection circuits 150 may control the access to one or more internal resources 110 of the processing system 10a via an external debug tool, or the possibility to perform a write (or similarly a read) access to specific memory areas, such as memory areas of the non-volatile memory 104a. For example, the use of the debug interface, such as a JTAG interface, may be deactivated by interrupting (via the protection circuit 150) the connection of the internal debug interface to the pins to which an external debugger may be connected. Accordingly, in this way, the debug interface will not respond to external requests provided to the respective pins.

Generally, while some resources 110 may possibly not have any access restrictions at all, the access to other resource 110 may be blocked (i.e. the protection may be activated) by default or selectively as a function of configuration data. For example, in various embodiments and as also described in detail in the Italian patent applications IT102017000062788 and IT102017000062830, which are incorporated herein by reference for this purpose, the protections of a given resource may be activated selectively as a function of the life cycle stage of the processing system 10a as indicated by life cycle data LCD and/or configuration data CD. For example, each protection 150 of the processing system 10a may be in one of the following states: the life cycle data LCD indicate that the protection is disabled independently of the configuration data CD; the life cycle data LCD indicate that the protection may be enabled selectively and the configuration data CD indicate that the protections is disabled; the life cycle data LCD indicate that the protection may be enabled selectively and the configuration data indicate that the protections is enabled; or the life cycle data LCD indicate that the protection is enabled independently of the configuration data CD.

In this regard, the above cited Italian patent applications also describe that the processing system 10a may support a life cycle data overwrite function and/or a configuration data overwrite function. Accordingly, also the access to such overwrite functions may be limited by means of suitable protection mechanisms (see e.g., blocks 1088 and 1106 of the above cited Italian patent applications).

Figure 4:
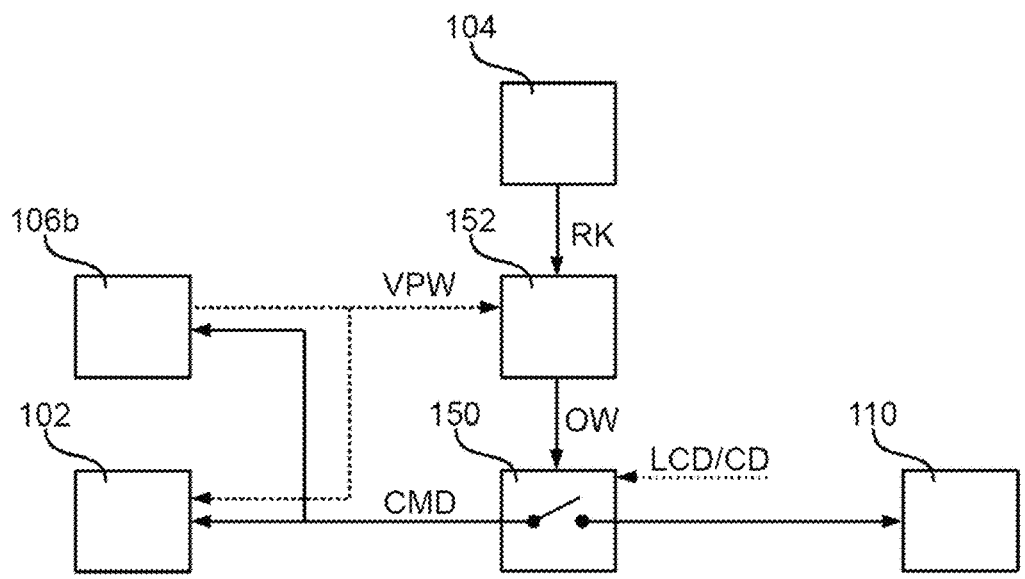
FIG. 4 shows a second embodiment of the security architecture of a processing system comprising a password verification circuit.

FIG. 4 shows an embodiment of a modified security architecture of the processing system 10a.

Specifically, in the embodiment considered, in order to grant access to protected resources, the processing system 10a comprises modules for overwriting one or more of the protections when a specific password is provided. Generally, some protections 150, once activated, may also not be deactivated anymore, or a given password may only deactivate a given sub-set of protections. For example, read protected memory areas containing security related data, such as cryptographic keys, may never be accessed, even when a password is provided.

In the embodiment considered, at least one reference password/keyword RK is stored in some way in the processing system 10a. For example, the reference password RK may be hardwired or stored in a non-volatile memory 104 of the processing system 10a, such as the non-volatile program memory 104a. In the latter case, the processing system 10a is preferably configured to limit read access to the memory area containing the reference password RK in order to ensure that the reference password RK is kept secret. For example, possible solutions for storing a reference keyword in a non-volatile memory are described in the above cited Italian patent applications.

In the embodiment considered, the processing system 10a comprises moreover a password verification circuit 152.

Accordingly, in order to deactivate at least one protection, the user should be able to provide a password verification command VPW comprising a password/keyword K to the password verification circuit 152. For example, in the embodiment considered, the user may provide the password K to the password verification circuit 152 via software instructions executed by the processing unit 102 of the processing system 10a and/or via a communication interface 106b of the processing system 10a, such as via a CAN interface or a (e.g., JTAG) debug interface connected to an external debugger.

For example, in various embodiments, the blocks 110, the password verification circuit 152, and the interface 106b and/or the processing unit 102 may be connected through a bus. In this case, the command CMD and the password verification command VPW may be transmitted over the same bus, specifying as target address either the address of a block 110 (for a command CMD) or the password verification circuit 152 (for a password verification command VPW).

Accordingly, once the password verification circuit 152 has received the password verification command VPW comprising the password K, the password verification circuit 152 may obtain the reference password RK and compared the password K with the reference password RK and, in case the two passwords match, the password verification circuit 152 may generate an overwrite signal OW, which is sent to one or more protection circuit 150. Accordingly, in response to the overwrite signal OW, the protection circuit(s) 150 may deactivate at least part of the respective protection.

The inventors have observed that, in particular in case the reference password(s) RK are stored in a non-volatile memory 104, such a dynamic access to reference password RK may be exposed to security risks.

For example, usually, access to a non-volatile memory 104 goes through a reading path comprising elements and features such as memory caches or pre-fetching transactions, concurrent access to the same bus, etc. Accordingly, it is likely that the reference password RK read from the non-volatile memory remains latched in one of the intermediate components, and an attacker may gain access to the reference password RK by spying the latched password.

In addition, the fact that the reference password RK is read dynamically from the non-volatile memory permits that an attacker may put the non-volatile memory 104 in a state, where it always returns the same and known value. Accordingly, in this way, the attacker could easily overwrite the protections 150 by providing the known value. For example, often non-volatile memories 104 have test modes used to run specific internal testing, which e.g., permit to monitor the current state of the memory cells. One possible example is a check of the voltage thresholds of the non-volatile memory cells. Accordingly, these modes may use specific internal conditions, for example some internal high voltage on some nodes of the logic, which prevent a concurrent reading operation from working properly, resulting into altered data being read.

Figure 5:
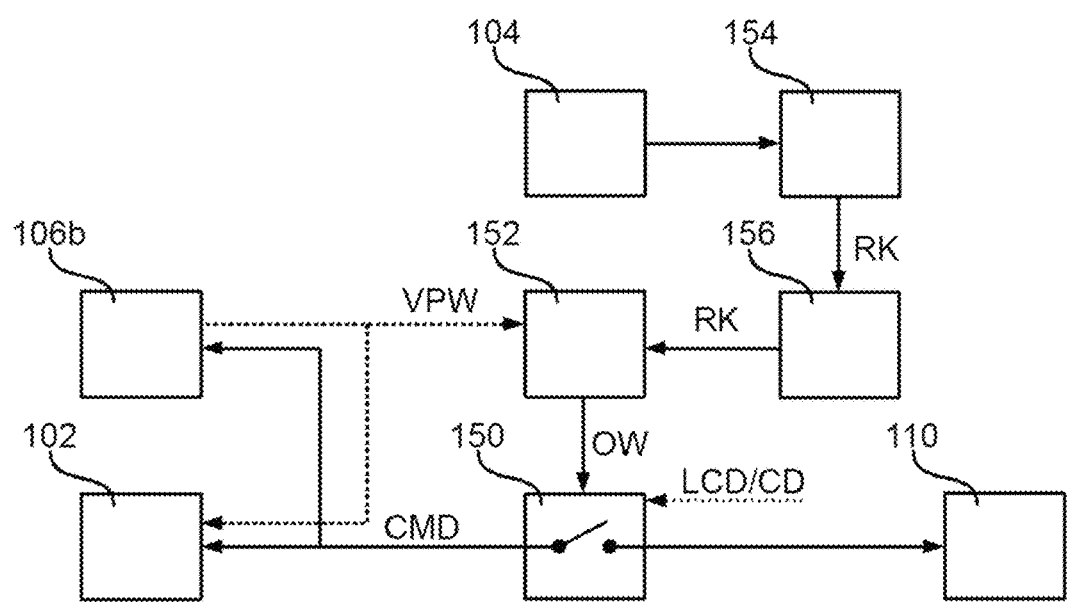
FIG. 5 shows a third embodiment of the security architecture of a processing system comprising a password verification circuit and a temporary password repository.

FIG. 5 shows in this context an embodiment of a modified security architecture.

Specifically, compared to FIG. 4, the processing system 10a comprises moreover a password upload circuit 154 and a temporary password repository 156.

Accordingly, in the embodiment considered, the password verification circuit 152 does not access dynamically the original reference password(s) RK, which is hardwired or preferably stored in the non-volatile memory 104. Conversely, the password upload circuit 154 reads the reference password(s) RK once and stores the reference password(s) RK in the temporary password repository 156, which is implemented either with registers or with a RAM, which may only be read by the password verification circuit 152. Accordingly, the password verification circuit 152 may compare the received password K with a reference password RK stored in the temporary password repository 156, where the read path between the password verification circuit 152 and the temporary password repository 156 is not shared with other resources of the processing system 10a and accordingly may not be spied.

As described in the foregoing with respect to the Italian patent applications IT102017000062788 and IT102017000062830, the protections may be activated and similarly also the blocks 110 may be configured based on life cycle data LCD and/or configuration data CD.

Figure 6:
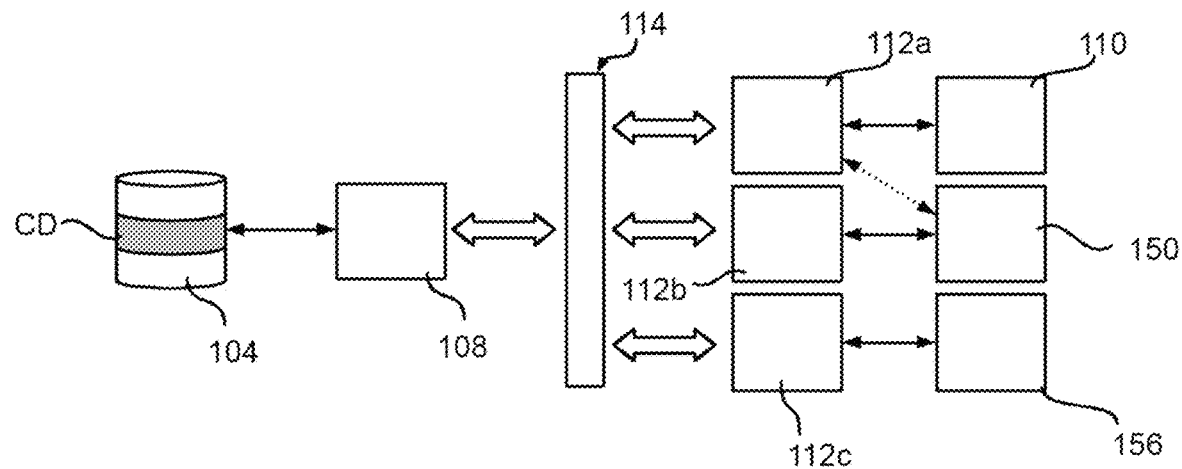
FIGS. 6 and 7 show embodiments of a processing system comprising a configuration module and configuration data clients for loading reference password into the temporary password repository of FIG. 5.

For example, FIG. 6 shows an embodiment of a processing system 10a, where the configuration data CD may be written into specific areas of a non-volatile memory 104 and retrieved when the processing system 10a is powered on. For example, the configuration data CD may be stored in the non-volatile program memory 104a and/or an additional non-volatile memory, such as a one-time programmable (OTP) memory, e.g., implemented with fuses. For example, the program memory 104a may be used, in case the blocks shown in FIG. 2 are integrated in a common integrated circuit. Conversely, an additional non-volatile memory may be used, in case the program memory 104a is an external memory, and only the other blocks are integrated in a common integrated circuit. Accordingly, in various embodiments, the configuration data CD are stored in a non-volatile memory 104 (non-volatile program memory 104a and/or a further non-volatile memory) of the integrated circuit comprising the blocks 110 requiring configuration data.

For example, such configuration data CD may include calibration data used to guarantee that the hardware behavior is uniform, thereby compensating possible production process tolerances. For example, this applies often to the calibration of analog components of the processing system, such as a temperature sensor, analog-to-digital converter (ADC), voltage reference, etc. Moreover, the configuration data CD may also be used to customize the behavior of the hardware, e.g., the hardware blocks 110 and/or the protection circuits 150, according to different application needs. For example, as mentioned before, once the firmware of the processing system 10a has been stored in the processing system 10a, some configuration data CD may be written in order to deactivate the debug interface, which e.g., could be used to download the firmware of the processing system 10a. Thus, generally a first part of the configuration data CD may be written by the producer of the hardware of the processing system (e.g., the producer of an integrated circuit), and/or a second part of the configuration data CD may be written by the developer of the firmware of the processing system 10a.

In various embodiments, the programmed configuration data CD are read during a configuration phase, which usually starts as soon as the processing system 10a is powered on.

Specifically, as shown in FIG. 6, the processing system 10a may comprise for this purpose a configuration module 108 configured to read the configuration data CD from the non-volatile memory 104, and distribute these configuration data CD within the processing system 10a. For example, in the embodiment considered, the configuration data CD are stored in reserved memory areas, e.g., in the form of a plurality of consecutive memory locations. Accordingly, in the embodiment considered, the configuration module 108 accesses the reserved memory areas containing the configuration data CD, reads the configuration data CD and transmits the configuration data CD to a respective block 110 and/or protection circuit 150 within the processing system 10a. As mentioned before, the block 110 may correspond to any block of the processing system 10a requiring configuration data and may correspond to the processing unit 102, a hardware resource 106 or even a memory (e.g., the memory 104a).

For example, in order to distribute the configuration data CD, each block 110 and each protection circuit 150 may have associated a respective configuration data client 112. For example, in FIG. 6 are shown two configuration data clients 112a, 112b which provide the configuration data to the blocks 110 and the protection circuits 150. Generally, each configuration data client 112 may be associated univocally with a single hardware block 110 or a single protection circuit 150, and provide configuration data only to the associated hardware block 110 or protection circuit 150, e.g., a specific hardware resource 106. However, the configuration data client 112 may also be associated with a plurality of hardware blocks 110 and/or protection circuits 150. For example, in various embodiments, the same configuration data client 112 is used to provide configuration data CD to a hardware block 110 and the protection circuit 150 associated with this hardware block 110. In general, the configuration data clients may also be integrated in the respective hardware block 110 or protection circuit 150.

Accordingly, in the embodiment considered, the configuration module 108 may determine for each target block 110/150 to be configured the respective configuration data (selected from the configuration data CD) and transmit the configuration data associated with the target block 110/150 to the configuration data client 112 associated with the target block 110/150. Similarly, while reading the configuration data CD from the memory 104, the configuration module 108 may determine the target block(s) for the current configuration information and send the current configuration data to the configuration data client(s) associated with the respective target block(s). Generally, any communication may be used for transmitting the configuration data CD to the configuration data clients 112, including both serial and parallel communications. For example, the configuration module 108 and the configuration data clients 112 may be connected via a bus 114, and each configuration data client 112 may have associated a respective target address.

Accordingly, each configuration data client 112 is configured to receive the configuration data from the module 108, store them into internal register, e.g., store them into one or more internal flip-flops or latches. The data stored in the register may then be used to generate one or more signals, which influence the behavior of one or more hardware blocks 110 and/or protection circuits 150.

In various embodiments, the above describe mechanism is also used to transmit the reference passwords RK to the temporary password repository 156. Specifically, in various embodiments, the reference password(s) RK are stored together with the configuration data CD in the memory 104, and a configuration data client 112c is associated (preferably univocally) with the temporary password repository 156. Accordingly, in various embodiments, the configuration module 108 reads also the reference password(s) RK together with the other configuration data CD from the memory 112 and sends the reference password(s) RK to the configuration data client 112c associated with the temporary password repository 156, thereby loading the reference password(s) RK into the temporary password repository 156.

Figure 7:
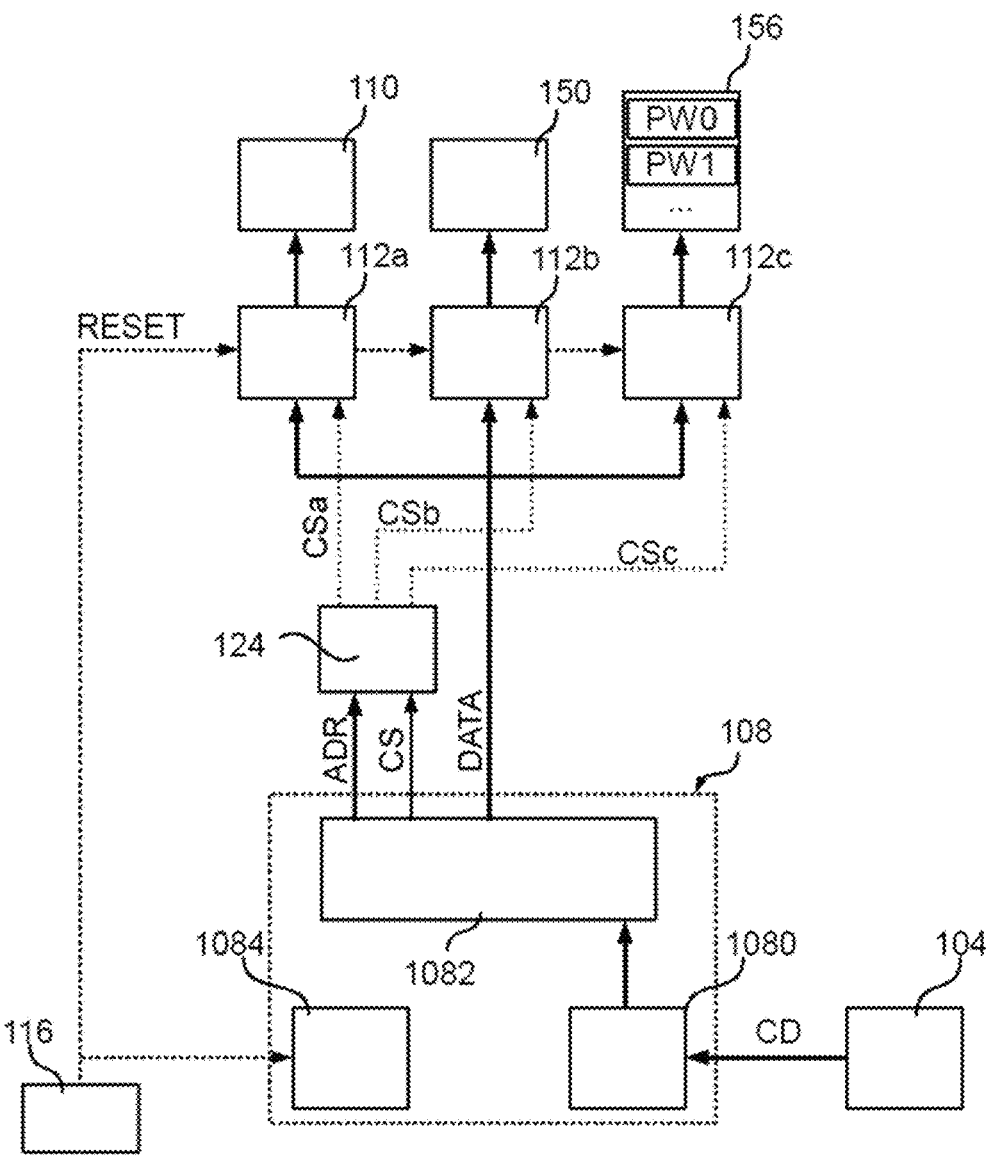

FIG. 7 shows in this respect a possible embodiment of the communication between the configuration module 108 and the configuration data clients 112.

Specifically, also in this case, the processing system 10a comprises a configuration module 108 configured to read the configuration data CD from one or more non-volatile memories 104 and a plurality of configuration data clients 112 configured to receive respective configuration data CD from the configuration module 108 and distribute them among the blocks 110/150/156 requiring configuration data. For example, as mentioned before, each configuration data client 112 may be associated univocally with a respective block 110/150/156. For example, in the embodiment considered, the processing system 10a comprises three configuration data clients 112a, 112b and 112c.

In the embodiment considered, the configuration module 108 comprises a data read module 1080 configured to read the configuration data CD from the memory 104 and a dispatch module 1082 configured to transmit the configuration data to the configuration data clients 112.

As mentioned before, any communication may be used for communication between the dispatch module 1082 and the configuration data clients 112. For example, in various embodiments, the communication between the dispatch module 1082 and the configuration data clients 112 is based on data frames in accordance with a given format, called in the following Device Configuration Format (DCF). For example, in various embodiments, each data frame comprises two fields: the payload (i.e., the real data), called DCF Format payload, and possible additional data attributes used to identify the receiver of the data, called DCF Format attributes, where the receiver is one of the configuration data clients 112 representing a DCF client. For example, the data attributes may consist in 16 or 32 bits, where a given number of bits specify the address of one of the configuration data clients 112, and the payload may consist in 16 or 32 bits. For example, in various embodiments, the data read module 1080 is configured to read blocks of 64 bits from the memory 104, where the first 32 bits contain the data attributes (including the address of a configuration data client) and the second 32 bits contain the configuration data to be transmitted to the address specified in the data attributes.

As described before, each configuration data client/DCF client 112 may be a hardware module, usually comprising a combinational circuit configured to store the received data in an internal register implemented, e.g., with flip-flops/latches, thereby permitting to distribute, via one or more internal signals generated as a function of the data stored in the internal register, the configuration data received to various parts of the associate hardware block(s) 110/150/156. For example, as mentioned before, each configuration data client 112 may have associated a univocal address (i.e., univocal within each processing system 10a) and analyses the data transmitted by the dispatch module 1082 in order to determine whether the additional data attributes (DCF Format attributes) contain the address associated with the configuration data client 112.

In various embodiments, the module 108 may also comprises a state control module 1084 configured to manage the various configuration phases of the processing system 10a.

For example, in various embodiments, once the processing system 10a is switched-on, a reset module 116 of the processing system 10a may generate a reset signal RESET, which is used to perform a reset of the various components of the processing system 10a. For example, the reset signal RESET may correspond to a reset pulse of a given number of clock cycles, provided to the blocks 110 of the processing system 10a. For example, in the embodiment considered, the reset signal RESET may be used by the configuration data clients 112 in order to set the internal register to a given reset value.

Similarly, in response to a reset, the state control module 1084 may activate the configuration phase. Specifically, during the configuration phase, the data read module 1080 may read the configuration data CD from the memory 104 and the dispatch module 1082 may send the configuration data CD to the various configuration data clients 112, thereby overwriting the reset values.

For example, in various embodiments, the dispatch module 1082 may generate a data signal DATA having a given number of bits (corresponding to the bits of the payload) containing the configuration data to be transmitted to a given configuration data client 112 and further control signals for selecting the target configuration data client 112. For example, in the embodiment considered, the dispatch module 1082 generates also an address signal ADR containing the address of the target configuration data client 112 and optionally a chip select signal CS used to signal that the address signal ADR and the data signal DATA are valid.

For example, in various embodiments, the address signal ADR (and the chip select signal CS) may be provided to a decoder 124 configured to activate one of the configuration data clients 112 as a function of the address signal ADR. For example, in the embodiment considered, the decoder 124 may set a chip select signal CSa in order to indicate that the configuration data client 112a should read the data signal DATA when the address signal ADR corresponds to an address assigned to the configuration data client 112a (and the chip select signal CS is set). Similarly, the decoder 124 may set a chip select signal CSb in order to indicate that the configuration data client 112b should read the data signal DATA when the address signal ADR corresponds to an address assigned to the configuration data client 112b (and the chip select signal CS is set), etc.

Accordingly, as mentioned before, the configuration data CD may also comprise security configuration data used to configure the protections 150, such as the external access to a debug interface or the (read and/or write) access to given memory locations, and the reference passwords RK to be stored in the temporary password repository 156.

Moreover, as mentioned in the foregoing, the configuration data CD may comprise two sub-sets of configuration data: a first group of configuration data (e.g., calibration data) written by the producer of the processing system 10a, e.g., the chip manufacture; and a second group of configuration data written during a later stage, such as configuration data written by the firmware developer and/or a system integrator, such as the producer of an ECU.

In various embodiments, these groups of configuration data are written to different areas of the memory(ies) 104, thereby permitting that these groups may be configured independently. For example, in this case, the security configuration data included in the first group of configuration data may also permit to set the access rights to the memory locations, in which the first group of configuration data are stored. For example, in this way, the first group of configuration data may not be overwritten, and/or the memory interface may inhibit a read access to the first group of configuration data (e.g., by the processing unit 102). Conversely, the security configuration data included in the second group of configuration data may be used to configure the behavior of the blocks 110 from a functional point of view, e.g., in order to enable or disable the debug interface, etc. Thus, also in this case, once the debug interface is deactivated, the second group of configuration data may not be overwritten or read. Similarly, the reference password(s) used to unblock the protections may be configured together with the first group and/or secondo group of configuration data. For example, the first group may contain a reference password for performing access operations to read and/or write protected memory locations and the second group may contain a reference password for enabling again the debug interface.

Accordingly, in various embodiments, the reset/configuration phase of the processing system 10a is used to store one or more reference passwords RK into a private/local memory (e.g., a RAM) of the temporary password repository 156. For example, in various embodiments, the reference passwords RK may be generated during the production phase and programmed into some area of the non-volatile memory 104 (for example some specific memory locations of the program memory 104a).

For example, in the embodiment discussed in the foregoing, the reference password(s) RK are read from the non-volatile memory 104 and distributed to the temporary password repository 156 via dedicated hardware components 108 and 112, e.g., by using the DCF data format. As mentioned before, the DCF data format permits to transfer different information, programmed inside the non-volatile memory, to various blocks within the processing system 10a using the same data bus. Specifically, each piece of configuration data is inserted in a frame together with the identifier/address of a configuration data client 112. The hardware configuration module 108 reads all theses DCF data frames programmed in the non-volatile memory 104 and sends them to the respective configuration data clients 112.

Accordingly, by including the reference password(s) RK in the DCF data frames having the address of the configuration data client(s) 112c associated with the temporary password repository 156, the reference password(s) RK may be stored in temporary password repository 156.

For example, as shown in FIG. 7, the temporary password repository 156 may comprises one or more slots PW0, PW1, . . . , each slot being adapted to store a respective reference password RK. Moreover, in the embodiment considered, a single configuration data client 112c is associated with the temporary password repository 156. In this case, a plurality of DCF frames (each comprising a respective reference password RK) may be sent in sequence to the address of the configured data client 112c and, once a reference password RK is received, the temporary password repository 156 may store the reference password into a respective slot PW0, PW1, . . . of the internal memory. Generally, the DCF frame may also include a field indicating the slot number, where the respective reference password RK should be stored.

Generally, due to the fact that the configuration data clients 112 comprise also internal registers, these registers may also be used directly as memory of the temporary password repository 152. For example, in this case, a plurality of configuration data clients 112c may be associated with the temporary password repository 152, where each configuration data clients 112c has a respective (univocal) address. In this case, a plurality of DCF frames (each comprising a respective reference password RK) may be sent in sequence to the addresses of the configured data clients 112c.

For example, the use of a RAM is advisable when a lot of reference password RK have to be stored into the temporary password repository 156 and/or when the passwords are long. Conversely, the internal register of one or more configuration data clients 112c may be used when only a single reference password RK has to be stored.

Once the password loading phase is completed, the reference passwords RK are stored in the memory of the temporary password repository 152. Accordingly, there is no need to further access the reference passwords RK stored in the non-volatile memory 104 upon a password challenge request. Accordingly, in the embodiment considered, the communication may not be spied by other blocks of the processing system 10a, because the other blocks are not operative during the configuration phase of the processing system 10a.

Figure 8:
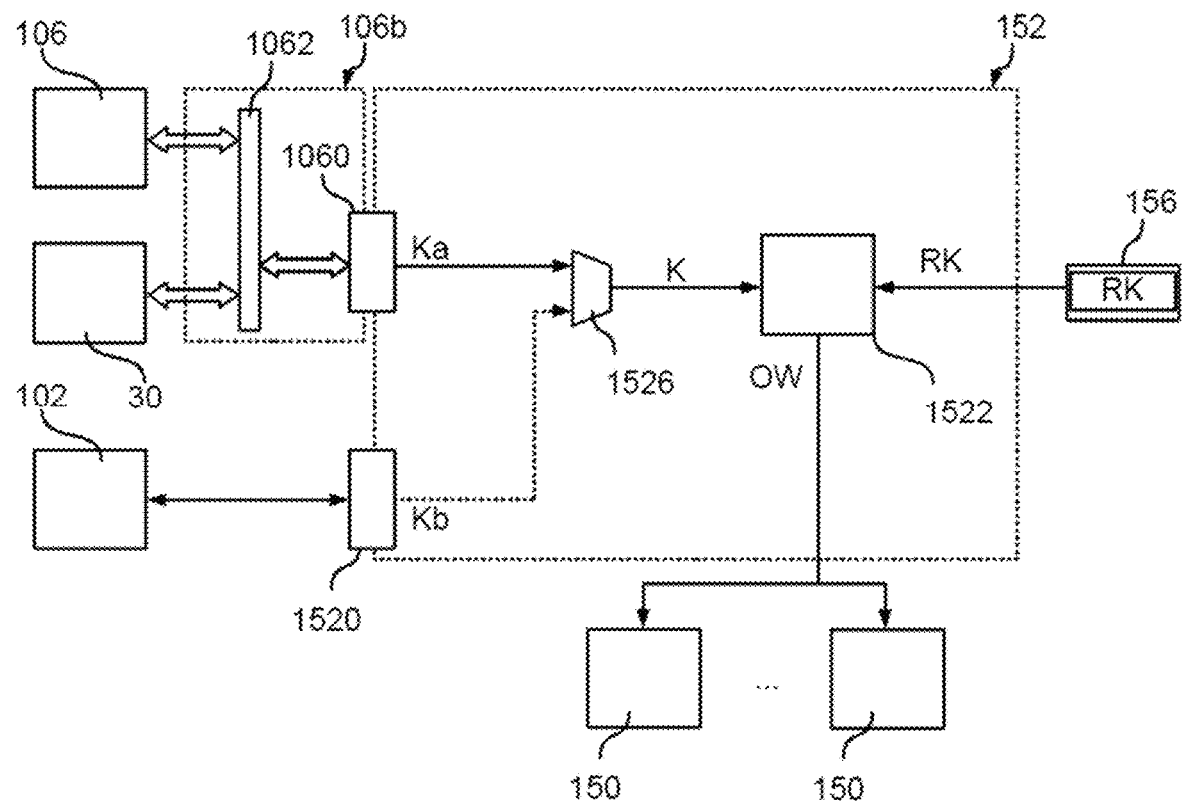
FIGS. 8 to 12 show embodiments of the password verification circuit of FIG. 5.

FIG. 8 shows an embodiment of the password verification circuit 152.

As mentioned before, the password verification circuit 152 is connected (e.g., directly) to the temporary password repository 156 for receiving a reference password RK to be used for a password verification operation. Specifically, in various embodiments, the reference password(s) RK are stored in dedicated areas of the non-volatile memory 104 of the processing system 10a. For example, theses reference password(s) RK may be programmed during the production phase. Next the reference password(s) RK may be read (e.g., together with other configuration data CD) by the hardware configuration module 108 of the processing system 10a and distributed to the various configuration data clients 112 within the processing system 10a. As mentioned before, the distribution of the configuration data CD including the reference password(s) RK may occur during a configuration phase, i.e., when the processing unit 102 and the other blocks (such as communication interfaces 106b) are not yet operative and only the configuration module 108 and the configuration data clients 112 are active.

Accordingly, in various embodiments, the reference password(s) RK are already loaded into the temporary password repository 156, when the processing unit 102 is activated.

Figure 9:
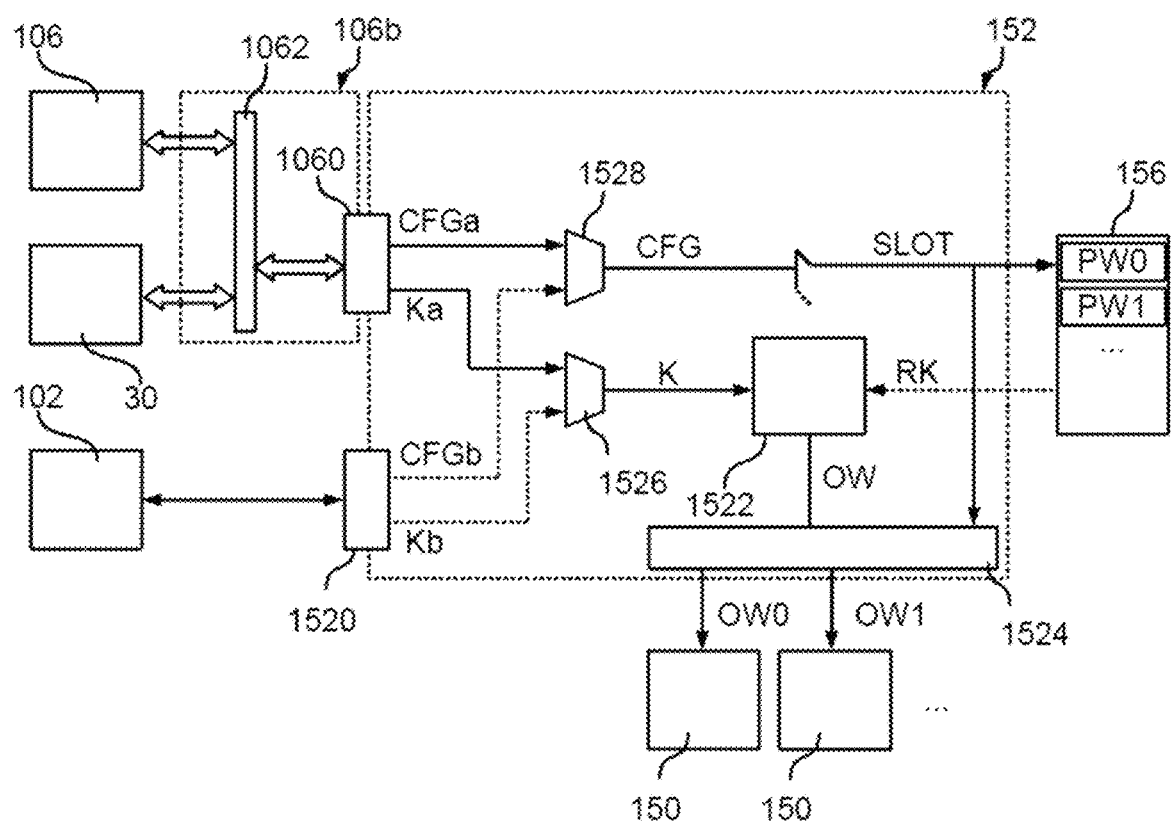

Generally, as shown in FIG. 8, the temporary password repository may contain only a single reference password. Conversely, FIG. 9 shows an embodiment, in which the temporary password repository 156 comprises a plurality of slots PW0, PW1, etc. for storing a plurality of reference passwords RK.

In both embodiments, the password verification circuit 152 comprises at least one interface for receiving a password K to be verified.

For example, as mentioned before, the password verification circuit 152 may receive a password verification command VPW including a password K from the processing unit 102 of the processing system 10a. Accordingly, in order to receive data from the processing unit 102, the password verification circuit 152 may comprise an interface 1520. For example, in various embodiments, the processing unit 102 is a microprocessor and the interface 1520 comprises one or more register addressable by the processing unit 102, such as so called special function registers of the processing unit 102. Accordingly, in various embodiments, the processing unit 102 may provide data to the password verification circuit 152 by writing the content of the registers 1520 via software instructions.

Similarly, as mentioned before, the password verification circuit 152 may receive data via a communication interface 106b, e.g., from another resource 106 of the processing system 10a or an external processing unit 30. For example, in the embodiment considered the interface 106b may a debug interface, such as a JTAG interface, connected to an external debugger 30.

As shown in FIG. 8, the (e.g., debug) interface 106b may indeed be split into a plurality of sub-interfaces connected through a bus 1062, where each sub-interface is associated with a respective block of the processing system 10a to be controlled via the (e.g., debug) interface. For example, this is exemplified in FIG. 8 by the interface 1060, which may only manage the debug commands addressed to the password verification circuit 152.

In the embodiment considered, the interface 1520 or 1060 may thus provide a password verification command VPW including a password K to be verified. For example, this is schematically shown in FIG. 8, where the interface 1060 may provide a password Ka and the interface 1520 may provide a password Kb. In the embodiment considered, these passwords Ka and Kb are then provided to a multiplexer 1526 configured to select either the password Ka or Kb (based on whether the interface 1060 or 1520 is used).

In the embodiment shown in FIG. 9, the temporary password repository 156 comprises a plurality of slots PW0, PW1, . . . . In this case, the password verification command VPW may include, and similarly the interfaces 1520 and/or 1060 may provide, additional password configuration data CFG associated with the respective password K to be verified. For example, this is schematically shown in FIG. 9, where the interface 1060 may provide password configuration information CFGa and the interface 1520 may provide password configuration information CFGb. In the embodiment considered, the respective password configuration information CFGa and CFGb are then provided to a multiplexer 1528 configured to select either the additional password configuration data CFGa or CFGb (based on whether the interface 1060 or 1520 is used).

For example, the additional password configuration data CFG may contain a slot number SLOT indicating the slot PW0, PW1, . . . of a reference password RK in the temporary password repository 156 to be used for the verification. Accordingly, the temporary password repository 156 may provide the respective reference password RK stored in the slot PW0, PW1, . . . indicated by the slot number SLOT.

In the embodiments shown in FIGS. 8 and 9, the password K received via the interface 1060/1520 and the (selected) reference password RK obtained from the temporary password repository 156 are provided to a comparison circuit 1522 configured to determine whether the password K corresponds to the (selected) reference password RK. In case the password K corresponds to the (selected) reference password RK, the comparison circuit 1522 generates an overwrite signal OW indicating that the password K is correct, i.e., the password K corresponds to the (selected) reference password RK.

For example, in the embodiment shown in FIG. 8 the password verification circuit 152 supports only a single reference password RK (i.e., the temporary password repository comprises only a single slot). In this case, the signal OW may be sent directly to one or more of the protections circuits 150, which thus may deactivate the respective protection. Generally, each protection circuit 150 may not only take into account the signal OW, but also further configuration information, such as the previously mentioned life cycle data LCD and/or configuration data CD, which may indicate whether the protection may indeed be deactivated or not by means of the signal OW.

Conversely, in the embodiment shown in FIG. 9, the password verification circuit 152 supports a plurality of reference passwords RK (i.e., the temporary password repository 156 comprises a plurality of slots). In this case, the signal OW may be sent to a circuit 1524. Specifically, in the embodiment considered, the circuit 1524 is configured to generate a plurality of overwrite signals OW0, OW1, . . . as a function of the signal OW and the slot number SLOT. For example, the block 1524 may be implemented with a combinational circuit or a look-up table.

For example, in various embodiments, a respective overwrite signal OW0, OW1, . . . is associated with each slot, and only the overwrite signal OW0, OW1, . . . associated with the currently used slot SLOT is set (e.g., to the logic level high) when the password K and RK match. Generally, the circuit 1524 may also comprises registers, e.g., flip-flops or latches, for storing the values of the overwrite signal OW0, OW1, . . . , which thereby maintain the value of the overwrite signals OW0, OW1, . . . when a new password verification is requested.

The overwrite signals OW0, OW1, . . . may then be provided to the various protection circuits 150, which thus may deactivate the respective protection. Generally, a respective overwrite signal OW0, OW1, . . . may be associated with each protection circuit 150, or each overwrite signal OW0, OW1, . . . may be associated also with a plurality of protection circuits 150.

Accordingly, in the embodiment considered, the circuit 1524 is configured to associate with each slot number a respective subset of protection circuits 150. Moreover, when the password received K corresponds to the reference password RK for a given slot SLOT, the circuit 1524 generates one or more signals OW0, OW1, . . . in order to inform the subset of protection circuits 150 associated with the given slot SLOT that the passwords match.

Also in this case, each protection circuit 150 may deactivate the respective protection not only as a function of the respective signal OW, but also as a function of further configuration information, such as the previously mentioned life cycle data LCD or configuration data CD, which may indicate whether the protection may be deactivated or not by using the password verification.

Accordingly, in the embodiment shown in FIG. 9, each slot PW0, PW1, . . . contains a given reference password RK and the slot index SLOT determines (via the circuit 1524), which protection circuit 150 is regulated by the password. For example, a given slot number (e.g., slot 3) may be associated with the protection circuit 150 controlling access to the debug interface, e.g., the access of the external debugger 30 to the debug bus 1062. Similarly, a given slot number (e.g., slot 2) may be associated with the protection circuit 150 regulating read and/or write access to the non-volatile memory 104. Generally, a given slot number (e.g., slot 1) may represent also a master password (e.g., written by the producer of the processing system 10a), which is associated with all protection circuits 150. Accordingly, neglecting that also further life cycle data LCD and/or configuration data CD may be taken into account, a protection may be removed by providing the correct password stored in a slot associated with the respective protection 150.

Accordingly, in the embodiments described in the foregoing, the password management is split into three functional blocks: the circuit 154, e.g., implemented with a hardware configuration module 108 and the configuration data client 112, used during the reset/configuration phase of the processing system 10a to pre-load the reference password(s) RK into the temporary password repository 156; the interfaces 1060 and/or 1520 and the temporary password repository 156 used during the run-time phase to provide, during a password challenge request, a password K and a reference password RK; and the comparison circuit 1522 (and optionally the circuit 1524) which execute the challenge and provides the result.

Accordingly, the temporary password repository 156 is used as a secure repository for the reference passwords RK, while the password verification circuit 152 processes password challenge requests received via the interfaces 1060 and/or 1520 and provides the result to the connected protection circuits 150.

Accordingly, in terms of functionality, the above blocks are active in two different phases: during the reset/configuration phase of the processing unit 10a, the temporary password repository 156 receives the reference passwords RK read from the non-volatile memory 104 and stores them into the local/private memory (e.g., a RAM); and during the run-time phase, the password verification circuit 152 executes password challenge requests and provides the challenge results to the protection circuits 150.

As mentioned before, the password challenge requests, i.e., the password verification commands VPW, may be received: via a hardware interface 106b (in particular via the interface 1060) of the processing system 10a, and/or from the processing unit 102 of the processing system 10a via the interface 1520.

Generally, the interfaces 1520 and 1060 have the same basic functionality, i.e., provide a password K and possible additional configuration information CFG to the password verification circuit 152. Thus, in principle, also a single interface could be used, e.g., in case the processing unit 102 is also connected to the bus 1062.

However, the inventor has observed that it is still preferable to have two separate interfaces. In fact, as mentioned before, the interface 1520 may be a register interface specifically adapted to interface the processing unit 102. For example, the interface 1520 may be a special function register of a microprocessor and programmed directly via software instructions executed by the processing unit 102.

Conversely, the interface 1060 may be part of debug interface 106b, such as a JTAG interface. In fact, in this case, various blocks of the processing system may have associated debug interfaces, which may also be connected through a debug bus 1062. Accordingly, a certain protection mechanism could be removed by providing a proper password through this debug interface (in case at least the portion 1060 of the debug interface associated with the password verification circuit 152 is not deactivated).

For example, in this way, a protection circuit 150 could be configured to deactivate the debug interface of the processing unit 102, e.g., based on the life cycle data LCD and/or the configuration data CD. Specifically, also the debug interface of the processing unit 102 may be connected to the bus 1062. Next an external debugger 30 could be used to provide a password K to the debug interface 1060 of the password verification circuit 152 and the password verification circuit 152 may generate the signal OW (or similarly one or more signals OW0, OW1, etc.), which is sent to the protection circuit 150 associated with the debug interface of the processing unit 102. In response to the signal OW, the protection circuit 150 may then re-activate the debug interface of the processing unit 102, and a developer may use the external debugger 30 to analyze the processing unit 102.

As mentioned before, the interface 1060 may be part of the (e.g., debug) interface 106b. As such, the specific protocol used to write data to the interface 1060 depends on the specific implementation of the interface 106b. For example, the most common protocols are based on request and busy signals. For example, the busy signal may be set by the password verification circuit 152 to communicate that the password verification circuit is performing already an operation, i.e., no password challenge requests are accepted. Conversely, the request signal may be set by the hardware client requesting a password challenge (only after the busy signal has been de-asserted). Moreover, the hardware client requesting a password challenge provides the password verification command VPW including the password to be verified K and if supported the additional password configuration information CFG, such as the password slot number SLOT.

Similarly, also the register interface 1520 may comprise a busy flag, to advice the processing unit 102 when the password verification circuit 152 is busy, and means for starting a challenge operation (such as a request flag), a register for storing the password to be verified K and optionally the further configuration data, in particular the slot index SLOT.

Figure 10:
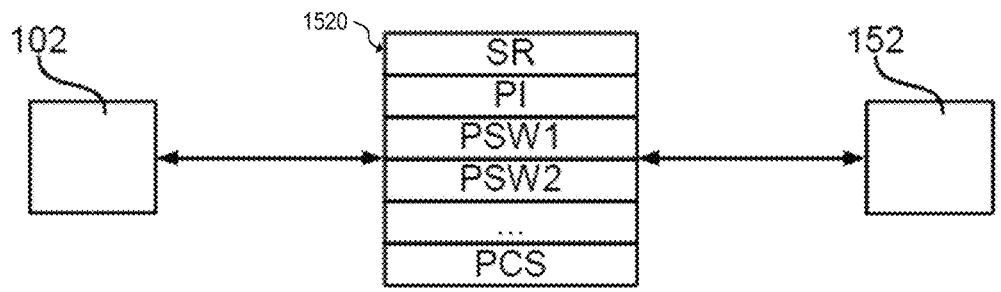

For example, FIG. 10 shows an embodiment of the register interface 1520.

Specifically, in the embodiment considered, the interface 1520 comprises:

a status register SR reporting the status of the password verification circuit 152, in particular the busy (or similarly a ready) flag, and possibly also the temporary password repository 156;

a password index register PI used to store the slot number SLOT, e.g., encoded with 6 bits thereby supporting up to 64 reference passwords;

one or more password registers PSW1, PSW2, ..., such as eight password registers, each having 32 bits, used to store a bit sequence specifying the password K to be verified; and an optional password challenge status register PCS, which may provide the result of the password comparison, e.g., the signal OW or the signals OW0, OW1, ....

Accordingly, when the password challenge operation is requested via software, the processing unit 102 may execute the following steps:

write the password index register PI, indicating the slot SLOT to be used; and write the content of the password registers PSW, where the writing of the last password register may automatically start the password verification operation.

Accordingly, in the embodiment considered, there exists no specific request bit to start the password challenge request, but the comparison is started as soon as the password is transferred into the password registers. However, in general, also one or more dedicated bits may be used to control the comparison operation.

Once the password challenge request has been received by the password verification circuit 152, the value of the reference password RK within the target slot SLOT is compared with the password K passed by the requester client. During this phase, the password verification circuit may set the busy flag in order to indicate that the password verification circuit 152 does not accept any other password challenge request.

If the password K provided by the client matches the reference password RK stored in the given slot SLOT, then the comparison circuit 1522 generates the overwrite signal OW indicating that the access may be granted. Generally, as mentioned before, the block 1524 may also provide respective overwrite signals OW0, OW1, ... only for a subset of the protection circuits 150.

Accordingly, once a protection circuit 150 receives the overwrite signal OW (or similarly the signals OW0, OW1, ... ), the protection circuit 150 may decide whether the protection should indeed be disabled.

For example, as mentioned before, each protection circuit 150 may take into account for this purpose the life cycle data LCD and/or the configuration data CD.

Additionally or alternatively, each protection circuit 150 may take into account also the identity of the circuit having requested the password verification.

For example, in the embodiments described in the foregoing, the interface 1520 accepts only requests from the processing unit 102. Accordingly, the identity of the requesting circuit may be determined implicitly. Conversely, the interface 1060 may be connected to a bus 1062. Accordingly, in this case, each device connected to the bus 1062 may be identified with a given address (being univocal within the processing system 10a). However, in general, also the interface 1520 may be connected to a bus, e.g., in case the processing system 10a comprises a plurality of processing units, such as a plurality of microprocessors.

Accordingly, the identity of the circuit requesting the verification of a password may correspond to the univocal address of the block within the processing system 10a and will be called in the following master identification MID.

Figure 11:
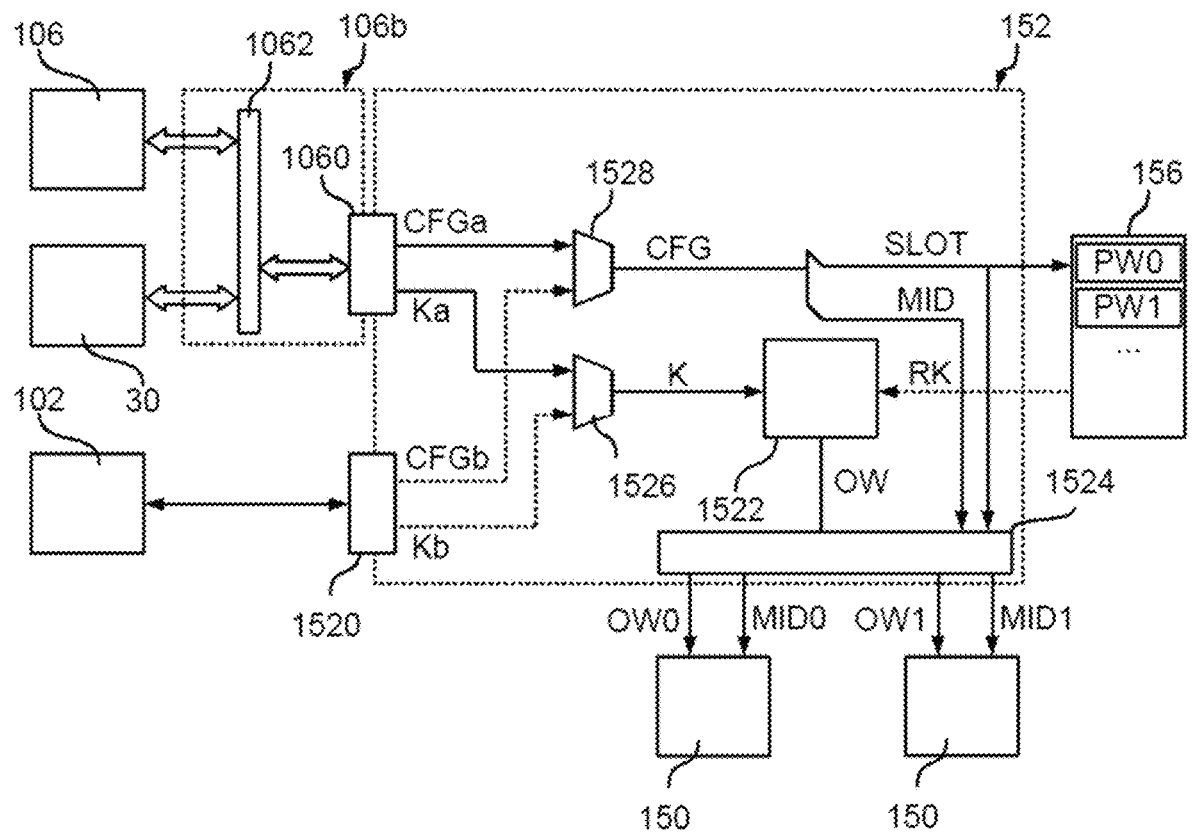

For example, FIG. 11 shows an embodiment, where this identification MID is provided by the interfaces 1060 and 1520 together with the additional configuration information CFG.

Moreover, in the embodiment considered, the number of the overwrite signal OW0, OW1, ... corresponds to the number N of slots in the temporary password repository 156, i.e., a respective signal OW0, OW1, ... is univocally associated with a respective slot. Accordingly, by providing the correct password K for a given slot SLOT, only the respective overwrite signal OW0, OW1, ... will be set, e.g., the signal OW0 will be set for the password PW0, the signal OW0 will be set for the password PW1, etc. As mentioned before, the overwrite signals OW0, OW1, ... may also be stored in registers, thereby permitting that plural overwrite signal OW0, OW1, ... may be set by providing sequentially the passwords for the various slots.

In the embodiment considered, when setting an overwrite signal OW0, OW1, ..., the block 1524 stores for the specific overwrite signal OW0, OW1, ... also the identification MID of the circuit having requested the password verification, i.e., the circuit 1524 provides N identification MID0, MID1, .... Accordingly, in the embodiment considered, once having verified that the password K corresponds to the reference password RK for the selected SLOT, not only the respective overwrite signal is set, but also the current identification MID is stored as the identification MID0, MID1, ... associated with the respective SLOT.

Accordingly, in the embodiment considered, the protection circuits 150 do not receive only the overwrite signal OW0, OW1, ..., but also the respective identification MID0, MID1, ....

In order to simplify the organization of the password management, in various embodiments, each password slot PW0, PW1, ... may be associated univocally with a single protection circuit 150, i.e., each password may only unblock the respective protection circuit 150. Accordingly, also the overwrite signal and the respective IDs MID associated with a given slot have to be provided only to the respective protection circuit 150. In this case, the number of slots N may be defined at design time, depending on how many protection circuits 150 with an associated password-dependent protection mechanism exist. Moreover, it is also simple to add a new additional protection circuit 150, by just adding a new reference password slot, and a new overwrite signal OV and identification MID output.

Generally, the protection circuits 150 may use the identification MID for different purposes.

For example, a protection circuit 150 may disable the protection only when the request comes from a circuit having a given identification MID. For example, in case of a multiprocessor system, when the request comes from a given microprocessor 102.

Additionally or alternatively, the protection circuit 150 may verify whether a given access request to the block 110 associated with the protection circuit (see also FIG. 5) has the same identification MID as the circuit having requested the password verification. Accordingly, the identification MID can be used by the protection circuits 150 to limit the access to the protected resource 110 only to the circuit identified by the same identification MID, thereby ensuring that only the circuit having provided the correct password may also access the respective protected resource 110.

For example, in this way, a first circuit may deactivate a first protection 150 by providing the first reference password PW0, and a second circuit may deactivate a second protection by providing the second reference password PW1, where the second circuit does not have access to the first protection.

Figure 12:
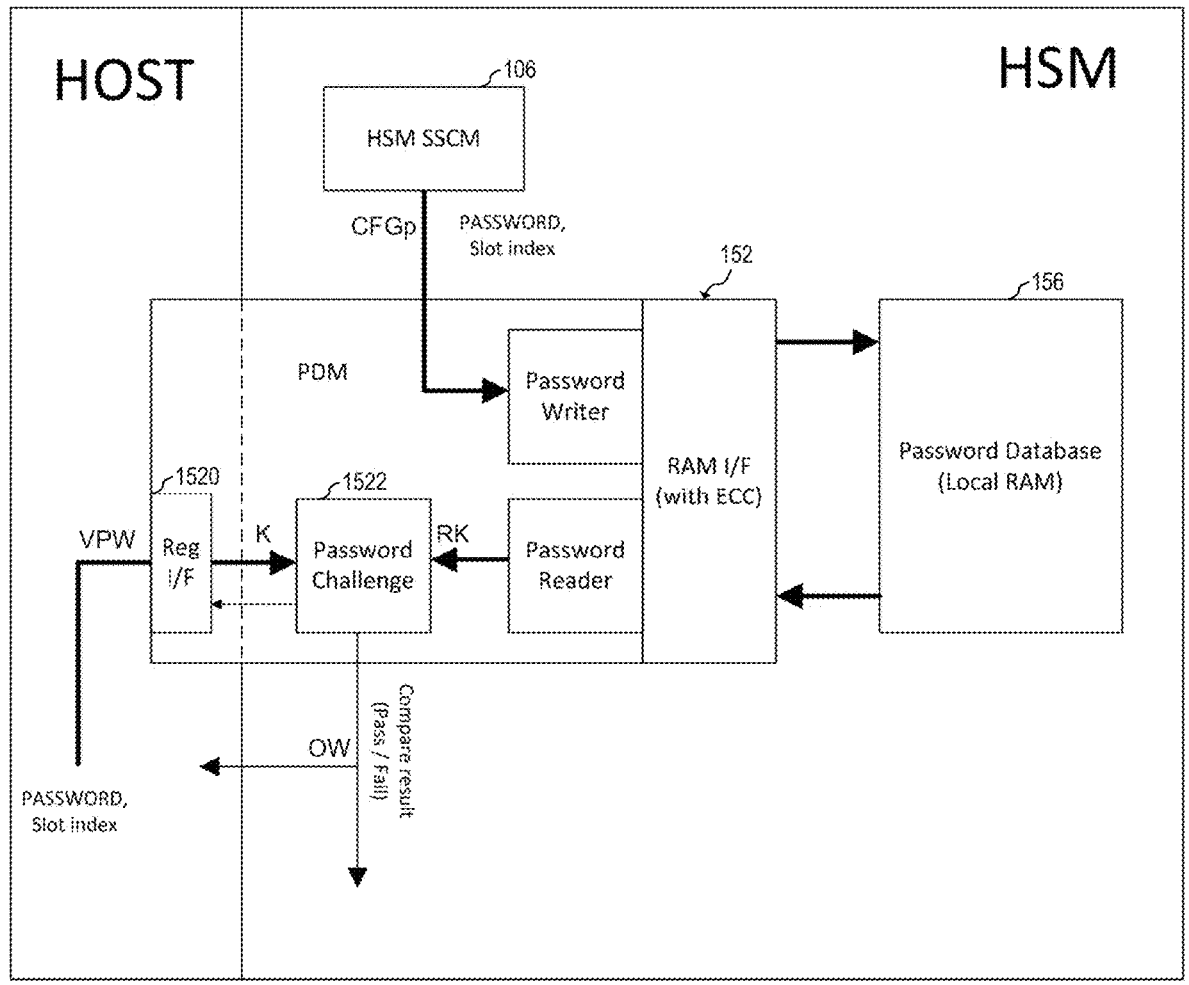

FIG. 12 shows an embodiment of the password verification circuit 152.

As shown in FIG. 12, the password verification circuit 152, also referred to as password database manager (PDM), is connected to the temporary password repository 156, also referred to as password database are disposed in a hardware security module (HSM) of a processing system 10*a*.

The temporary password repository 156 may be loaded with one or more reference passwords. In some embodiments, the loading/writing of reference passwords RK into the local memory (e.g., RAM) of the temporary password repository 156 may only be allowed during a reset phase (e.g., reset signal RESET asserted). In some embodiments, the reference passwords RK may be generated during the production/manufacturing of the processing systems.

In embodiments where the temporary password repository 156 stores more than one reference password RK, each of the reference passwords is stored in a respective slot SLOT, which is specified, for example, by password configuration information CFGp.

In some embodiments, the reference passwords include error correction code (ECC).

In some embodiments, the password verification circuit 152 receives a password verification command VPW that includes a password K to be verified and a slot location. The password verification circuit 152 uses the slot location to access the temporary password repository 156 and retrieve the corresponding reference password RK. The comparison circuit 1522 receives the password K and the reference password RK that corresponds to the specified slot in the password verification command VPW and compares the password K with the (selected) reference password RK. In case the password K corresponds to the (selected) reference password RK, the comparison circuit 1522 generates an overwrite signal OW indicating that the password K is correct, i.e., the password K corresponds (i.e., matches) to the (selected) reference password RK.

In some embodiments, only one comparison by the comparison circuit 1522 may be done at a time. In such embodiments, if an additional request for password verification is received, the password verification circuit 152 may reject the request.

In some embodiments, a password challenge requests includes: programming a password index register PI of the interface 1520 to indicate the slot, and writing eight times 32-bits to the respective password registers PSW0:PSW7 of the interface 1520, where the most significant bit is written to the password register PSW0. Once the password register PSW7 (i.e., the last register) is written, the comparison circuit 1522 performs the comparison. In some embodiments, the result of the comparison is provided in the status register PCS of the interface 1520.

In some embodiments, if the master that writes the PI register is different from the master that writes any of the PSW0:PSM7 registers, the comparison fails.

In some embodiments, words having a different number of bits (e.g., 8, 16, etc.) may be used. In some embodiments, more password registers (e.g., 9, 10, or more) or less (e.g., 7, 6, 5) may be used.

Advantages of some embodiments include allowing for centralization of password storage while keeping the passwords secure during the password challenge.

Of course, without prejudice to the principle of the invention, the details of construction and the embodiments may vary widely with respect to what has been described and illustrated herein purely by way of example, without thereby departing from the scope of the present invention, as defined by the ensuing claims. For example, in order to increase the robustness of the password verification, the password verification circuit 152 may verify whether the password K provided by the requester client has a special value (e.g., all-1, all-0, etc.) which will result always in a comparison failure.

What is claimed is:

1. A processing system comprising:
    a non-volatile memory configured to store a reference password;
    a password verification circuit configured to:
        receive a password verification command including a password from a first circuit;
        obtain the reference password stored in the non-volatile memory;
        test whether the password received and the reference password correspond; and
        when the test indicates that the password and the reference password correspond, generate an overwrite signal;
    a hardware block;
    a protection circuit associated with the hardware block, wherein the protection circuit is configured to receive a control command from the first circuit, and selectively forward the control command to the hardware block as a function of the overwrite signal;
    a temporary password repository including a memory configured to store the reference password, wherein the password verification circuit is configured to obtain the reference password from the temporary password repository;
    a password upload circuit configured to read the reference password from the non-volatile memory and store the reference password read from the non-volatile memory in the temporary password repository;

a first hardware block or first protection circuit, wherein the first hardware block or first protection circuit is configured to change operation as a function of configuration data, wherein the non-volatile memory is configured to store the configuration data, and wherein the reference password is stored together with the configuration data in the non-volatile memory;

a first configuration data client associated with the first hardware block or first protection circuit, the first configuration data client configured to receive configuration data and provide the configuration data received to the associated first hardware block or first protection circuit;

a hardware configuration module configured to read the configuration data from the non-volatile memory and transmit the configuration data read from the non-volatile memory to the first configuration data client; and a second configuration data client, the second configuration data client configured to receive configuration data from the hardware configuration module and provide the configuration data received to the temporary password repository, wherein when the hardware configuration module reads the configuration data from the non-volatile memory, the hardware configuration module transmits the reference password to the second configuration data client.

2. The processing system of claim 1, wherein the password upload circuit is configured to read the reference password from the non-volatile memory and store the reference password read from the non-volatile memory in the temporary password repository when the processing system is switched on and the first circuit is not operative.

3. The processing system of claim 1, further comprising a reset circuit configured to generate a reset signal when the processing system is switched on, and wherein the hardware configuration module is configured to read the configuration data from the non-volatile memory and transmit the configuration data read from the non-volatile memory to the first configuration data client.

4. The processing system of claim 3, wherein the hardware configuration module is configured to transmit the configuration data read from the non-volatile memory to the second configuration data client in response to the reset signal.

5. The processing system of claim 1, comprising a communication bus, wherein the hardware block is coupled to the communication bus for receiving the control command, and wherein the password verification circuit comprises a first interface connected to the communication bus for receiving the password verification command.

6. The processing system of claim 5, wherein the communication bus is a Joint Test Action Group (JTAG) bus.

7. The processing system of claim 5, wherein the first circuit comprises a microprocessor, wherein the password verification circuit comprises a second interface for receiving the password verification command from the microprocessor, and wherein the second interface comprises a register addressable by the microprocessor via software instructions.

8. The processing system of claim 1, wherein the temporary password repository comprises a plurality of slots for storing a plurality of reference passwords, wherein the password verification command includes a field for specifying a slot number, and wherein the temporary password repository is configured to provide a first reference password stored in the slot indicated by the slot number.

9. The processing system of claim 8, wherein the password verification circuit is configured to generate for each slot a respective overwrite signal indicating that the password received and the first reference password stored in the slot indicated by the slot number correspond.

10. The processing system of claim 1, wherein the password verification circuit is configured to, when the test indicates that the password and the reference password correspond, transmit a signal containing an identification of the first circuit having provided the password verification command to the protection circuit.

11. The processing system of claim 1, wherein the first circuit is a processor.

12. The processing system of claim 1, wherein the first circuit comprises a communication interface.

13. A method of operating a processing system, the method comprising:
    starting the processing system;
    reading a reference password from a non-volatile memory of the processing system;
    receiving, with a first configuration data client, configuration data read from the non-volatile memory, and providing, with the first configuration data client, the received configuration data to an associated first hardware block or first protection circuit, wherein the first hardware block or first protection circuit changes operation as a function of the configuration data;
    receiving, with a second configuration data client, configuration data read from the non-volatile memory and the reference password, and providing, with the second configuration data client, the received configuration data and the reference password to a temporary password repository of the processing system;
    storing the reference password in the temporary password repository;
    receiving a password verification command including a password from a processing unit of the processing system;
    obtaining the reference password from the temporary password repository;
    testing whether the password received and the reference password correspond; and
    when the password and the reference password correspond, transmitting an overwrite signal to a protection circuit of the processing system.

14. The method of claim 13, further comprising storing the reference password in the non-volatile memory.

15. The method of claim 13, further comprising providing the password verification command, wherein the providing the password verification command comprises:
    writing a password index register with a slot number; and
    writing one or more password registers with the password, wherein obtaining the reference password comprises obtaining the reference password based on the password index register.

16. The method of claim 15, further comprising writing a status register a value based on the testing.

17. An integrated circuit comprising a processing system comprising:
    a non-volatile memory configured to store a plurality of reference passwords;
    a temporary password repository including a memory configured to store the reference passwords;
    a password upload circuit configured to read the reference passwords from the non-volatile memory and store the reference passwords in the temporary password repository;

a password verification circuit configured to:
  receive a password verification command, from a first circuit, that includes a password and a slot number,
  obtain a reference password of the plurality of reference passwords from the temporary password repository based on the slot number,
  test whether the password received and the reference password correspond and produce a result based on the test, and
  when the result indicates that the password and the reference password correspond, generate an overwrite signal;
a hardware block;
a protection circuit coupled to the hardware block, wherein the protection circuit is configured to receive a control command from the first circuit and selectively forward the control command to the hardware block as a function of the overwrite signal,
a first hardware block or first protection circuit, wherein the first hardware block or first protection circuit is configured to change operation as a function of configuration data, wherein the non-volatile memory is configured to store the configuration data, and wherein the reference passwords are stored together with the configuration data in the non-volatile memory;
a first configuration data client associated with the first hardware block or first protection circuit, the first configuration data client configured to receive configuration data and provide the configuration data received to the associated first hardware block or first protection circuit;
a hardware configuration module configured to read the configuration data from the non-volatile memory and transmit the configuration data read from the non-volatile memory to the first configuration data client; and
a second configuration data client, the second configuration data client configured to receive configuration data from the hardware configuration module and provide the configuration data received to the temporary password repository, wherein when the hardware configuration module reads the configuration data from the non-volatile memory, the hardware configuration module transmits the reference password to the second configuration data client.

18. The integrated circuit of claim 17, wherein the password verification circuit comprises a register interface connected to a communication bus for receiving the password verification command.

19. The integrated circuit of claim 18, wherein the register interface comprises:
  a password index register; and
  a password register, wherein receiving the password verification command that comprises receiving the slot number in the password index register and receiving the password in the password register.

20. The integrated circuit of claim 17, wherein the integrated circuit is a micro-controller of an engine control unit of a vehicle.

21. The integrated circuit of claim 17, wherein the password verification circuit comprises a first interface connected to a communication bus for receiving the password verification command, and a second interface for receiving the password verification command from the first circuit, wherein the second interface comprises a register addressable by the first circuit via software instructions.

* * * * *